US006099943A

United States Patent [19]

Moeller et al.

[11] Patent Number: 6,099,943

[45] Date of Patent: Aug. 8, 2000

[54] PRESSURE SENSITIVE LINERLESS LABEL ASSEMBLIES WITH DRY RELEASE

[75] Inventors: Scott A. Moeller, Grand Island; David K. Rice, Sanborn; Adele C. Shipston, Williamsville, all of N.Y.

[73] Assignee: Moore U.S.A., Inc., Grand Island, N.Y.

[21] Appl. No.: 09/063,402

[22] Filed: Apr. 21, 1998

[51] Int. Cl.[7] .......... B32B 3/00

[52] U.S. Cl. .......... 428/195; 428/199; 428/411.1; 428/413; 428/423.1; 428/423.7; 428/480

[58] Field of Search .......... 428/195, 199, 428/411.1, 413, 423.1, 423.7, 480

[56] References Cited

U.S. PATENT DOCUMENTS

| | | | |
|---|---|---|---|
| 3,420,364 | 1/1969 | Kennedy, Jr. . | |
| 3,479,328 | 11/1969 | Nordstrom . | |
| 3,674,838 | 7/1972 | Nordstrom . | |
| 3,978,274 | 8/1976 | Blum . | |
| 3,989,609 | 11/1976 | Brack . | |
| 4,003,751 | 1/1977 | Carder . | |
| 4,479,838 | 10/1984 | Dunsirn et al. . | |
| 4,544,590 | 10/1985 | Egan . | |
| 4,568,403 | 2/1986 | Egan . | |
| 4,569,712 | 2/1986 | Shibano et al. . | |
| 4,721,638 | 1/1988 | Matsuguchi et al. . | |
| 4,724,166 | 2/1988 | deBruin . | |
| 4,747,619 | 5/1988 | Sager . | |
| 4,759,816 | 7/1988 | Kasper et al. . | |
| 4,833,122 | 5/1989 | Doll et al. . | |
| 4,837,088 | 6/1989 | Freedman . | |
| 4,863,772 | 9/1989 | Cross . | |
| 4,872,707 | 10/1989 | deBruin . | |
| 4,876,123 | 10/1989 | Rivera et al. . | |
| 4,925,714 | 5/1990 | Freedman . | |
| 5,005,874 | 4/1991 | Matsuguchi et al. . | |
| 5,019,436 | 5/1991 | Schramer et al. . | |
| 5,039,652 | 8/1991 | Doll et al. . | |
| 5,267,898 | 12/1993 | Doll et al. . | |
| 5,284,689 | 2/1994 | Laurash et al. . | |
| 5,292,713 | 3/1994 | Stenzel et al. . | |
| 5,324,078 | 6/1994 | Bane . | |
| 5,354,588 | 10/1994 | Mitchell et al. . | |
| 5,358,281 | 10/1994 | Greig . | |
| 5,366,410 | 11/1994 | Lombardo . | |
| 5,366,952 | 11/1994 | Granquist . | |
| 5,389,415 | 2/1995 | Kaufmann . | |
| 5,478,880 | 12/1995 | Shipston et al. | 524/527 |
| 5,543,192 | 8/1996 | Shipston et al. . | |
| 5,547,227 | 8/1996 | Laurash et al. . | |
| 5,547,738 | 8/1996 | Mitchell et al. | 428/195 |
| 5,569,515 | 10/1996 | Rice, II et al. . | |
| 5,578,352 | 11/1996 | Smith . | |
| 5,621,020 | 4/1997 | Khatib et al. . | |
| 5,704,650 | 1/1998 | Laurash et al. . | |
| 5,707,713 | 1/1998 | Langan et al. . | |
| 5,792,296 | 8/1998 | Soltysiak | 156/184 |
| 5,804,610 | 9/1998 | Hamer et al. | 522/182 |

*Primary Examiner*—William Krynski
*Assistant Examiner*—Betelhem Shewareged
*Attorney, Agent, or Firm*—Finnegan Henderson Farabow Garrett & Dunner

[57] ABSTRACT

Pressure sensitive adhesive linerless label assemblies having a primer layer and a breakaway layer capable of being separated from each other after the label is applied to a surface, thus leaving a portion of the assembly on the surface and removing the other portion. In one embodiment, the primer layer is an ethylene/acrylic acid copolymer and the breakaway layer is polyvinyl acetate. In another embodiment, the primer layer is a polyethylene emulsion and the breakaway layer is a polyurethane emulsion. In a third embodiment, the primer layer is a composition of a UV curable bisphenol A epoxy oligomer, pentaerythritol triacrylate, and a monofunctional styrene monomer, and the breakaway layer is polyvinyl acetate.

13 Claims, 1 Drawing Sheet

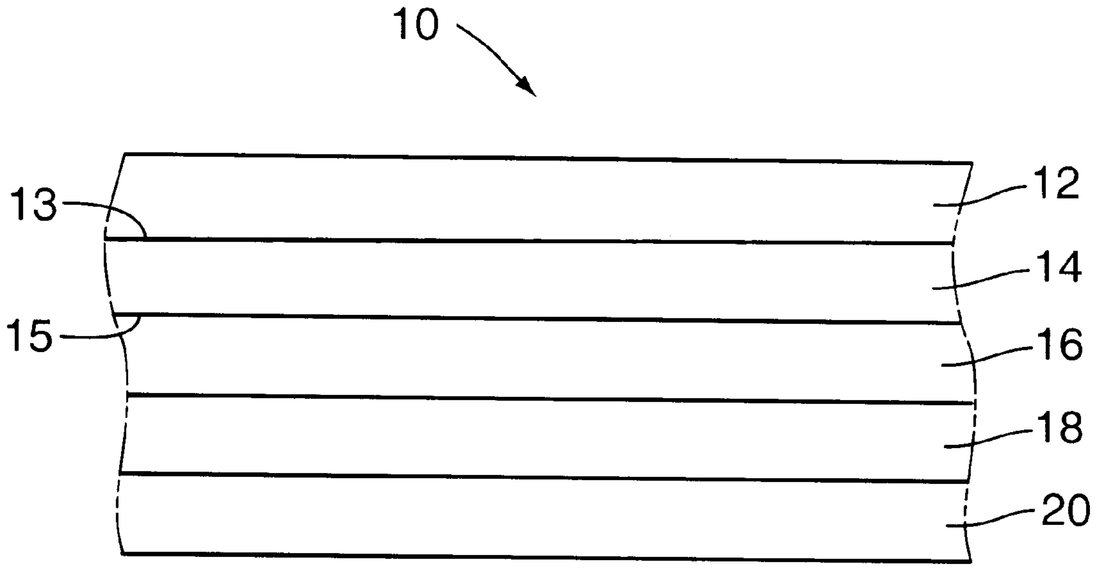
10
12
13
14
15
16
18
20

PRESSURE SENSITIVE LINERLESS LABEL ASSEMBLIES WITH DRY RELEASE

BACKGROUND OF THE INVENTION

1. Field of the Invention

This invention relates to linerless labels and, in particular, to pressure sensitive adhesive linerless label assemblies that can be applied to a substrate, with a portion of the assembly being subsequently removable from the substrate.

2. Description of Related Art

Linerless labels, such as shown in U.S. Pat. Nos. 5,292,713, 5,324,078, 5,354,588, and 5,578,352, the disclosures of which are incorporated by reference herein, are known to have advantages over conventional pressure sensitive labels that are mounted on a separate liner having a release coating. In conventional labels, the liner acts as a support for transport, printing and storage, and is discarded after the label is removed from the liner. In contrast, a linerless label has a face surface that is coated with a release coating and a back surface that is coated with a pressure sensitive adhesive (PSA). A strip of linerless labels may be wound in a roll configuration so that the PSA on the back side of the strip is in contact with the release coating on the face side of the strip, where the release coating faces outwardly. The adhesion between the PSA and release coating holds the strip in a roll. Labels can be peeled off individually from the roll of linerless labels, without having a liner web to tear off and discard each time a label is used.

Because a liner web is not needed in a roll of linerless labels, certain advantages and cost savings are realized, including substantial material reduction due to the lack of a liner, elimination of the disposable liner and costs associated with release coated liners, and space savings in that a roll of linerless labels can have about twice as many labels as a same size roll of labels with liners. Moreover, linerless labels have significant environmental advantages over linered labels because of the elimination of the need to dispose of the liner after each use.

Label assemblies having a removable portion of the label are known. U.S. Pat. No. 4,724,166 to deBruin discloses a linered label assembly that, after removal of the liner, can be applied to a substrate; thereafter, a portion of the assembly can be removed from the substrate, leaving the remainder of the assembly on the substrate. The deBruin assembly includes a sheet of stock material, a first dry coating layer on the stock material and a second dry coating layer on the first coating layer, a pressure sensitive adhesive coating layer on the second dry coating layer, and a coated liner backing web on the adhesive. The first and second dry coating layers are substantially incompatible so that, after removal of the liner web from the adhesive and application of the adhesive to a substrate, the first and second coating layers separate from one another, leaving the adhesive and second coating layer attached to the substrate.

Because the deBruin patent label assembly uses a liner web, it suffers from the disadvantages of linered labels generally as discussed above. In addition, the patent discloses that the first and second coatings can be any combination of polyamide varnishes, acrylic ester varnishes, and wax containing release compositions.

SUMMARY OF THE INVENTION

Accordingly, the present invention is directed to a linerless pressure sensitive adhesive label assembly that substantially obviates one of more of the problems due to limitations and disadvantages of the related art.

The present inventors have discovered that certain specific combinations of materials can be used as the release, primer and breakaway layers for a linerless pressure sensitive adhesive label that provide the following advantages: (1) the label has a stable and consistent release; (2) the label is reliable when running through a direct thermal printer; (3) the materials are suitable for application to a linerless, direct thermal web; (4) the label is inexpensive to produce; and (5) the materials are readily available.

To achieve the advantages and in accordance with the purpose of the invention, as embodied and broadly described herein, the invention is a linerless assembly that includes (a) a substrate having first and second faces; (b) a release layer coated onto the first side of said substrate; (c) a primer layer coated onto the second side of said substrate; (d) a breakaway layer coated onto said primer layer; and (e) a pressure sensitive adhesive layer coated onto said breakaway layer. The primer and breakaway layers of the assembly of the invention are capable of being separated from one another when the label, after being applied to a surface, is pulled therefrom. This leaves the pressure sensitive adhesive layer and the breakaway layer on the surface.

The exposed surface of the breakaway layer is non-tacky, as is the exposed surface of the primer layer.

In further aspects of the invention, the primer layer and breakaway layer are selected such that (1) the primer layer is an ethylene/acrylic acid copolymer and the breakaway layer is polyvinyl acetate, (2) the primer layer is a polyethylene emulsion and the breakaway layer is a polyurethane emulsion, and (3) the primer layer is a composition including a UV curable bisphenol A epoxy oligomer, pentaerythritol triacrylate, and a monofunctional styrene monomer, and the breakaway layer is polyvinyl acetate.

It is to be understood that both the foregoing general description and the following detailed description are exemplary and explanatory only and are not restrictive of the invention, as claimed.

Additional advantages of the invention will be set forth in part in the drawing and description that follows, and in part will be obvious from the drawing and description, or may be learned by practice of the invention. The advantages of the invention will be realized and attained by means of the elements and combinations particularly pointed out in the appended claims.

BRIEF DESCRIPTION OF THE DRAWINGS

FIG. 1 is a cross-sectional view of an exemplary linerless label assembly of the present invention showing each of the layers (with greatly exaggerated thickness).

DETAILED DESCRIPTION OF THE PREFERRED EMBODIMENTS

In accordance with the invention, an exemplary section of the linerless label assembly is shown generally by reference numeral 10 in FIG. 1. The label assembly 10 according to the invention includes a substrate 14 having a first face 13 and a second face 15. The substrate can be any conventional substrate used in label applications, such as bond paper, latex impregnated paper, vinyl, or polyester. The substrate is preferably a thermally sensitive paper, and more preferably is direct thermal paper or ink jet/thermal transfer paper. Examples of direct thermal paper that can be used as the substrate in the invention include NT Grade 9118, available from Nashua Corporation, Specialty Coated Products Division, Merrimack, N.H., and OPTIMA thermal paper, available from Appleton Papers of Appleton, Wis. The preferred substrate for use in the invention is Nashua direct thermal paper NT Grade 9118. Both first and second faces 13, 15 of substrate 14 may have printing thereon.

In accordance with the invention, a release layer 12 is coated onto the first face 13 of substrate 14. Release layer 12 can be any conventional release material used in linerless pressure sensitive adhesive labels. More particularly, release layer 12 is any suitable material that imparts a lower surface energy to first face 13 of substrate 14 so that it will release easily from the pressure sensitive adhesive when the assembly is unwound from the linerless roll. Preferably, release layer 12 is a silicone release material that may be, for example, TEGO RC silicone, available from Goldschmidt Chemical Corporation, Hopewell, Va., or a printable release such as, for example, Moore Printable Release, available from Moore USA, Lake Forest, Ill. The release material is most preferably TEGO RC silicone. Release layer 12 is preferably transparent so that any printing on first face 13 of substrate 14 is readable.

In accordance with the invention, a primer layer 16 is coated onto the second face 15 of substrate 14 and a breakaway layer 18 is coated onto primer layer 16. Primer layer 16 and breakaway layer 18 are composed of materials that provide for a bond between the two layers having a tensile strength that is greater than the tensile strength between release layer 12 and the pressure sensitive adhesive layer 20 so that, after the assembly is wound onto itself in a linerless label roll, the assembly can be unwound without sticking or pulling apart. However, the tensile strength of the bond between primer layer 16 and breakaway layer 18 must be less than the bond strength between pressure sensitive adhesive layer 20 and the surface to which the adhesive is adhered so that the two layers separate without removing the adhesive from the surface. Moreover, primer layer 16 and breakaway layer 18 are selected such that the label assembly can be run through a direct thermal linerless printer without separating the two layers.

Breakaway layer 18 may have printing applied to the surface opposite primer layer 16, before application of the adhesive. Both primer layer 16 and breakaway layer 18 may be tinted but are preferably transparent so that any printing on breakaway layer 18 and on second face 15 of substrate 14 will be readable after primer layer 16 and breakaway layer 18 are separated from one another. Any message printed on breakaway layer 18 would be in mirror image so it would be readable after primer layer 16, substrate 14 and release layer 12 are removed from breakaway layer 18 and pressure sensitive adhesive layer 20. Primer layer 16 and breakaway layer 18 are selected in accordance with the invention so that, after they are separated from one another, both the exposed surface of primer layer 16 and the exposed surface of breakaway layer 18 are non-tacky.

In accordance with a particularly preferred embodiment of the invention, primer layer 16 is an ethylene/acrylic acid copolymer and breakaway layer 18 is polyvinyl acetate. An example of an ethylene/acrylic acid copolymer that can be used in the invention is Dyna-Tech XS67, available from Dyna-Tech Adhesives, Inc., Grafton, W.Va. An example of a polyvinyl acetate that can be used in the invention is Dyna-Tech XS13BA, available from Dyna-Tech Adhesives, Inc., Grafton, W.Va.

In accordance with a second embodiment of the invention, primer layer 16 is a polyethylene emulsion and breakaway layer 18 is a polyurethane emulsion. An example of a polyethylene emulsion that can be used in the invention is MICHEM 44730, available from Michelman, Inc., Cincinnati, OH. An example of a polyurethane emulsion that can be used in the invention is NeoRez R9637, available from Zeneca Resins, Wilmington, Md.

In accordance with a third embodiment of the invention, primer layer 16 is a composition of UV curable bisphenol A epoxy oligomer, pentaerythritol triacrylate, and a monofunctional styrene monomer, and breakaway layer 18 is polyvinyl acetate. An example of a composition including a UV curable bisphenol A epoxy oligomer, pentaerythritol triacrylate, and a monofunctional styrene monomer that can be used in the invention is RAD-KOTE 818XS, available from Rad-Cure, Fairfield, N.J. An example of a polyvinyl acetate that can be used in the invention is RAQUA-BOND WBA6040, available from Rad-Cure, Fairfield, N.J. In this embodiment of the invention, primer layer 16 must be cured with sufficient UV light, prior to application of breakaway layer 18, to render it non-tacky and non-smearing when primer layer 16 and breakaway layer 18 are separated from one another.

Pressure sensitive adhesive layer 20 is coated onto breakaway layer 18. Pressure sensitive adhesive layer 20 may be a permanent adhesive, a removable adhesive, or a repositionable adhesive. Examples of permanent adhesives that can be used in the invention include, for example, aqueous Dyna-Tech XPLR-73, available from Dyna-Tech Adhesives, Inc., Grafton, W.Va., or hot melt adhesive Duro-Tak 34-4144, available from National Starch and Chemical Company, Bridgewater N.J. Examples of removable adhesives that can be used in the invention include, for example, hot melt adhesive H2181, available from Findley Adhesives, Inc., Wauwatosa, Wis. Examples of repositionable adhesives that can be used in the invention include, for example, CLEANTAC adhesive, available from Moore U.S.A., Lake Forest, Ill. The preferred adhesive for use in the invention is Duro-Tak 34-4144.

The linerless label assembly 10 of the invention can be made by press coating primer layer 16, preferably by use of a gravure cylinder, onto second face 15 of substrate 14 after any optional printing is applied to second face 15. Breakaway layer 18 is then coated onto primer layer 16 using, for example, a gravure or wire-wound rod method. After any optional printing is applied to first face 13 of substrate 14, release layer 12 is coated onto first face 13 of substrate 14. Finally, after any optional printing is applied to breakaway layer 18, pressure sensitive adhesive layer 20 is coated onto breakaway layer 18.

In accordance with the invention, the printing on first face 13 of substrate 14 can be applied during manufacturing. Typically, a spool of the linerless label assembly of the invention is placed in a label applicator that cuts the continuous strip into individual labels, transports each one to the point of application, and affixes each label to the desired article. The printing on substrate 14 will be visible after the label is applied to the article. Subsequently, the removable portion of the label can be removed to be used by the customer, for example, as a coupon, ID card, or game token. The exposed surfaces of primer 16 and breakaway layer 18 are non-tacky after removal of the label from the article.

Alternatively, a printer/label applicator can be used to print on the label and apply the label to the desired article. A roll of the linerless labels of the invention is loaded into a printer/label applicator. Here, variable information is printed onto first face 13 of substrate 14 prior to application of the label to an article. Such printing can be done by direct thermal, thermal transfer, or ink jet printing methods. After printing, the individual labels can be cut from the roll and applied to the article. The printed information can be used for identification, tracking, or delivery purposes.

It will be apparent to those skilled in the art that various modifications and variations can be made to the present invention and in construction of this invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A linerless label assembly comprising:

a substrate having first and second faces;

a release layer coated onto the first face of said substrate;

a primer layer coated onto the second face of said substrate;

a breakaway layer coated onto said primer layer; and a pressure sensitive adhesive layer coated onto said breakaway layer, wherein said primer and breakaway layers are capable of being separated from one another when said label, after being applied to a surface, is pulled therefrom, thereby leaving said pressure sensitive adhesive layer and said breakaway layer on said surface.

2. The label of claim 1, wherein said primer layer comprises an ethylene/acrylic acid copolymer and said breakaway layer comprises a polyvinyl acetate material.

3. The label of claim 1, wherein said primer layer comprises a polyethylene emulsion and said breakaway layer comprises a polyurethane emulsion.

4. The label of claim 1, wherein said primer layer comprises a composition including a UV curable bisphenol A epoxy oligomer, pentaerythritol triacrylate, and a monofunctional styrene monomer, and said breakaway layer comprises polyvinyl acetate.

5. The label of claim 1, wherein said pressure sensitive adhesive is a permanent adhesive.

6. The label of claim 1, wherein said pressure sensitive adhesive is a removable adhesive.

7. The label of claim 1, wherein said pressure sensitive adhesive is a repositionable adhesive.

8. The label of claim 1, wherein said substrate is direct thermal paper.

9. The label of claim 1, wherein said release layer is a silicone material.

10. The label of claim 1, wherein said first and second sides of said substrate are capable of being printed thereon before or during assembly of said label.

11. The label of claim 1, wherein said breakaway layer is capable of being printed thereon before or during assembly of said label.

12. The label of claim 1, wherein the exposed surface of said primer layer after separation from said breakaway layer is non-tacky.

13. The label of claim 1, wherein the exposed surface of said breakaway layer after separation from said primer layer is non-tacky.

* * * * *